Figure 1:
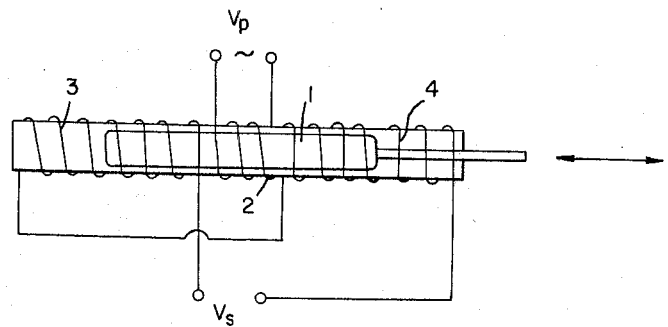

Oct. 25, 1966   JOHN-ERIK ANDERSSON   3,281,809
DIFFERENTIAL TRANSFORMER FOR REGISTERING LINEAR MOVEMENTS
UTILIZING BRIDGE CIRCUIT WINDINGS
AND MEANS FOR CALIBRATION
Filed March 23, 1962

INVENTOR
JOHN-ERIK ANDERSSON

United States Patent Office 3,281,809
Patented Oct. 25, 1966

3,281,809
DIFFERENTIAL TRANSFORMER FOR REGISTERING LINEAR MOVEMENTS UTILIZING BRIDGE CIRCUIT WINDINGS AND MEANS FOR CALIBRATION
John-Erik Andersson, Karlskoga, Sweden, assignor to Aktiebolaget Bofors, Bofors, Sweden, a corporation of Sweden
Filed Mar. 23, 1962, Ser. No. 182,140
Claims priority, application Sweden, Mar. 29, 1961, 3,357/61
3 Claims. (Cl. 340—199)

When registering linear movements, inductive measuring devices are now used to a great extent. Of these, the so-called differential transformer is very widely used, due to the good linearity which can be obtained, and the freedom from ambiguity near the zero or null position.

A differential transformer consists of a primary winding, two secondary windings, and a core made of a magnetic material. The primary winding is fed with an alternating current of an appropriate frequency and voltage. The two secondary windings are connected together in such a way that the output voltages from the windings will be phase-turned 180° in relation to each other. When the core is in its symmetry position inside the transformer, the two secondary voltages will be of equal size, but since they are phase-turned 180° in relation to each other, the resulting output voltage will be zero.

When the core is displaced from its symmetry position, the output voltage from one of the secondary windings increases, while it decreases from the other, whereby it can be achieved that the resulting output voltage increases linearly with the displacement of the core.

When the core is displaced in one direction, the output voltage will form an angle $\alpha$ with the primary voltage, and when it is displaced in the opposite direction, it will form the angle $(\alpha+180°)$ in relation to the primary voltage.

As the amplitude of the output voltage thus varies, and shifts phase when passing through zero, the transformer can be connected to a phase-sensitive detector, to obtain a positive or a negative signal, depending upon in which direction the core is displaced.

However, variable differential transformers as hitherto known have the disadvantage that the calibration procedure is very difficult for certain uses. The differential transformer must sometimes be used in places where it is impossible to check the displacement of the core.

The purpose of the present invention is to provide an inductive measuring device for registering linear movements, comprising a differential transformer in which the core follows the movement which it is desired to register and which can be calibrated without measuring any displacement of the core from the zero position.

This is achieved according to the invention in that the primary winding of the transformer is connected in parallel with two branches, each of which contains a secondary winding of the transformer and a resistor, and by a detector being connected between the junction point of the secondary winding and the resistor in one of the branches and the junction point of the secondary winding and the resistor in the other branch.

It is hereby achieved that an output voltage corresponding to a given displacement of the core can be obtained by shunting one of the secondary windings with a fixed resistor.

Figure 2:
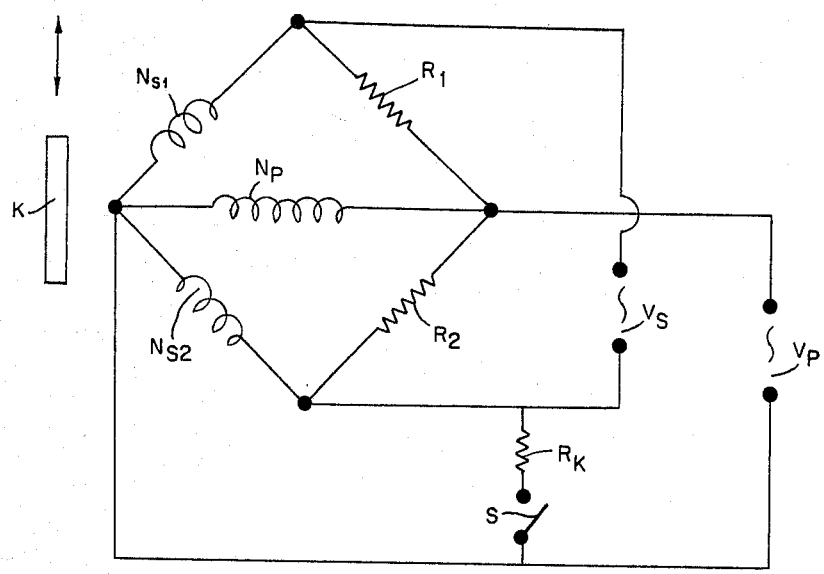

In the following the invention will be described in more detail with reference to the accompanying drawing in which FIG. 1 shows a diagram of a transformer as previously referred to and FIG. 2 shows a wiring diagram for a transducer according to the invention.

The differential transformer according to FIG. 1 comprises a lengthwise displaceable core 1, a primary winding 2 supplied with A.-C. voltage $V_p$, a first secondary winding 3 and a secondary winding 4 connected to the first winding in phase opposition. The secondary voltage is indicated at $V_s$.

In FIGURE 2, a linearly variable differential transformer is shown with a primary winding $N_P$, which is fed with an alternating voltage $V_P$. The secondary windings of the transformer have been designated $N_{S_1}$ and $N_{S_2}$, each of which is connected in parallel with the primary winding in series with resistors of equal size, $R_1$ and $R_2$. Secondaries $N_{S_1}$ and $N_{S_2}$ are made of resistance wire and with comparatively few winding turns, and have, accordingly, very high resistance in relation to the reactance. When the core K of the transformer is displaced from the illustrated zero position, an output voltage $V_S$ which is fed to a detecting means will arise which varies linearly with the displacement. As shown in FIGURE 2, a fixed resistor $R_K$ may be provided to shunt the winding $N_{S_2}$. The resistor $R_K$ has no inductance and has a resistance which is considerably higher than that of resistors $R_1$ and $R_2$. When the resistor $R_K$ is connected by a switch S, the output voltage $V_S$ will correspond to the displacement of the core through a certain distance from the zero position, and when the number of turns of the primary winding $n_s$ is small in relation to the number of turns of the secondary windings $n_p$, the change in the output voltage which arises when the resistor $R_K$ is connected will be independent of the position of the core K.

The displacement $l_K$ of the movable core to which the connection of the resistor $R_K$ corresponds is obtained from the following equation $$\frac{l_K}{l_S}=\frac{n_p}{n_s}\cdot\frac{R}{2R_K}$$

in which $R=R_1=R_2=$the resistance of $N_{S_1}=$the resistance of $N_{S_2}$ and in which $l_S$ designates the length of each of the secondary windings of the transformer.

What is claimed is:
1. An electric measuring device for measuring rectilinear displacement of a body, said device comprising: a differential transformer having a primary winding and two secondary windings wound about a core which is lengthwise displaceable in accordance with the displacement to be measured, a first branch circuit connected in parallel with said primary winding, said branch circuit including one of said secondary windings and a first resistance means in serial connection, said secondary winding and said first resistance means being dimensioned so that the inductance of said secondary winding is very small and less than the inductance of said primary winding and the resistance of said first resistance means provides a very high value of short circuit resistance, a second branch circuit in parallel with said primary winding, said second branch circuit including the other of said secondary windings and a second resistance means in serial connection, said other secondary winding and resistance means being dimensioned so that the inductance of said secondary winding is very small and less than the inductance of said primary winding and the resistance of said resistance means provides a very high value of short circuit resistance; a source of A.-C. voltage connected across said primary winding; and the junction point of the secondary winding and the resistance means in one branch being adapted to transmit a voltage and the junction point of the secondary winding and the resistance means in the other branch being adapted to transmit a voltage whereby the output voltage developed across said junction means is indicative of the position of dis- placement of the core in reference to said secondary windings.

2. An electric measuring device for measuring rectilinear displacement of a body and means for calibrating said device comprising: a differential transformer having a primary winding and two secondary windings wound about a core which is lengthwise displaceable in accordance with the displacement to be measured, a first branch circuit connected in parallel with said primary winding, said branch circuit including one of said secondary windings and a first resistance means in serial connection, a second branch circuit connected in parallel with said primary winding, said second branch circuit including the other of said secondary windings and a second resistance means in serial connection, said resistance means being of equal ohmic values, said secondary windings having very small inductances and less than the inductance of said primary winding; a source of A.-C. voltage connected across the primary winding; an ohmic resistance means adapted to be connected in parallel with the secondary winding in one of said branches by means of a switch for the purpose of calibrating said measuring device, said ohmic resistance means having a resistance value higher than that of the resistance means included in said branches; and the junction point of the secondary winding and the resistance means in one branch being adapted to transmit an output voltage and the junction point of the secondary winding and the resistance means in the other branch being adapted to transmit an output voltage whereby the output voltage across said junction points is indicative of the position of displacement of the core in reference to the secondary windings.

3. The electric measuring device and means for calibrating said device of claim 2, wherein each of said secondary windings has a resistance component very much greater than the inductive reactance component of the winding and wherein each of said resistance components has the same ohmic value which is equal to the ohmic values of said resistance means.

References Cited by the Examiner

UNITED STATES PATENTS

| 2,427,866 | 9/1947 | Macgeorge | 340—199 |
| 2,457,165 | 12/1948 | McNamee | 323—75 |
| 2,927,266 | 3/1960 | Richter | 324—34 |
| 3,036,266 | 5/1962 | Hulls | 324—34 |
| 3,083,469 | 4/1963 | Herbst | 336—30 |

OTHER REFERENCES

Perry, C. C., and Lissner, H. R.: The Strain Gage Primer, N.Y., McGraw-Hill, 1955, pages 89–93.

WALTER L. CARLSON, *Primary Examiner.*

FREDERICK M. STRADER, *Examiner.*

F. A. SEEMAR, R. J. CORCORAN, *Assistant Examiners.*